United States Patent [19]

Lester et al.

[11] E Re. 30,905

[45] Reissued Apr. 20, 1982

[54] MULTI-SECTION TELESCOPIC BOOM

[75] Inventors: Robert J. Lester, Sunderland; Raymond Murta, West Boldon, both of England

[73] Assignee: Coles Crane Ltd., Sunderland, England

[21] Appl. No.: 161,791

[22] Filed: Jun. 23, 1980

Related U.S. Patent Documents

Reissue of:

[64] Patent No.: 4,156,331
Issued: May 29, 1979
Appl. No.: 850,129
Filed: Nov. 10, 1977

[30] Foreign Application Priority Data

Nov. 11, 1976 [GB] United Kingdom ..... 47015/76

[51] Int. Cl.[3] ..... E04H 12/34

[52] U.S. Cl. ..... 52/115; 52/118; 212/268

[58] Field of Search ..... 52/115, 118, 121; 212/55, 268

[56] References Cited

U.S. PATENT DOCUMENTS

| | | | |
|---|---|---|---|
| 3,749,254 | 7/1973 | Grider | 212/55 |
| 3,817,007 | 6/1974 | Hall | 52/121 X |
| 3,842,985 | 10/1974 | Suede | 52/121 X |
| 4,057,942 | 11/1977 | Kromefield et al. | 52/115 |

*Primary Examiner*—Price C. Faw, Jr.
*Assistant Examiner*—Carl D. Friedman
*Attorney, Agent, or Firm*—Townsend and Townsend

[57] ABSTRACT

A multi-section telescopic jib or boom comprising a base section and three movable sections mounted to extend or retract relative to each other on operation of drive means within the sections, including a first ram connected between the base section and the innermost sections, a second ram connected between the innermost and central sections and a chain having [ends connected between the innermost section or the first ram] *one end connected to the lowermost section or first ram and the other end connected to the innermost section* and engaging a chain wheel mounted on the central section or second ram, means being provided to releasably connect the chain to the outermost section to extend the boom.

9 Claims, 8 Drawing Figures

MULTI-SECTION TELESCOPIC BOOM

Figure 1:
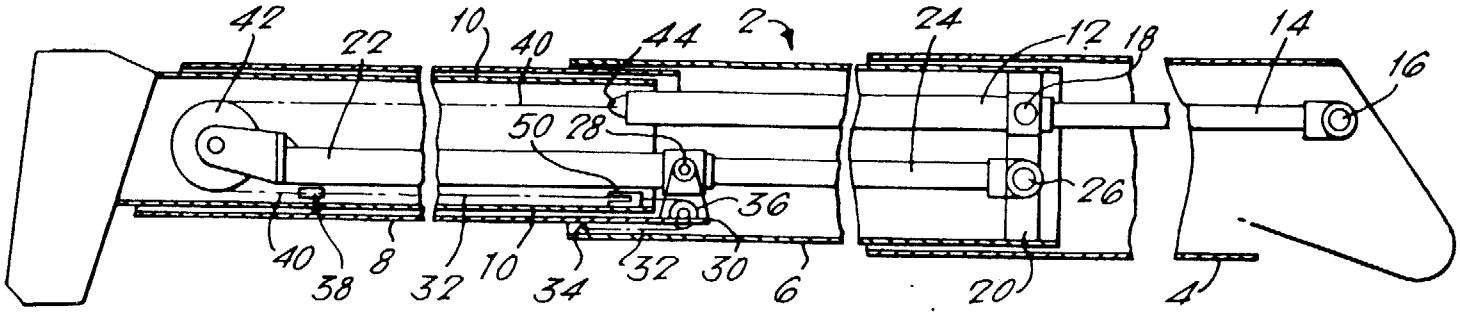

Matter enclosed in heavy brackets [ ] appears in the original patent but forms no part of this reissue specification; matter printed in italics indicates the additions made by reissue.

This invention relates to multi-section telescopic jibs or booms and more particularly to such a boom incorporating a system of rams and chains to extend and retract the sections.

The system used hitherto for relatively small booms includes a single hydraulic ram coupled mechanically to the first movable section, the other movable sections being driven by heavy duty chains using a 2:1 drive ratio. This arrangement is limited by the size of the boom due to the difficulty of accommodating heavy duty chains within the telescopic boom sections.

A more convenient method of telescoping the sections of larger booms is to employ a separate ram for each movable section. However the number of sections that can be operated in this way is also limited by the number of rams of suitable size which can be accommodated within the boom. It is also known to employ, on a large boom having three telescopic sections, two rams connected to the first and second movable sections, the third or "manual" movable section having no power drive means. This "manual" section may remain retracted while the other two movable sections are telescoped outwadly, or alternatively, the "manual" section may be fully extended and pinned to the second movable section to provide added length to the boom when required.

Although various methods exist for extending or retracting the third or "manual" movable section these have the disadvantage that they all require a measure of manual effort and time to perform.

An aim of the present invention is to provide a relatively large, multi-section telescopic boom which overcomes the above disadvantages.

According to the present invention a telescopic boom comprises a base section and at least three movable sections mounted for telescopic extension and retraction with respect to each other and to the base section on operation of drive means positioned within the sections comprising a first ram operatively connected between the base section and the innermost of the movable sections, a second ram connected between the innermost and the central movable sections and a chain or its equivalent having its two ends connected between the innermost movable section or the first ram *an innermost section* and surrounding or engaging a chain wheel or the like mounted on the central movable section or on the second ram, means being provided releasably to connect the chain to the outermost movable section when it is desired to extend the boom to its maximum length.

Preferably the connection means comprises an anchor secured intermediate the ends of the chain dividing it into two sections acting during use as extension and retraction members respectively which anchor may be releasably coupled to a bracket at the inner end of the third or outer section of the boom.

Conveniently the anchor is coupled to the bracket by slideable pins which are engaged and disengaged by means of linear actuators operated by remote control.

The remote control of the linear actuators is preferably by means of electric motors.

A suitable linear actuator is an electro-mechanical actuator known as the Duff-Norton Mini-Pac Mechanical actuator sold by Consolidated Pneumatic Tool Co. Ltd., and forms the subject of British Pat. Nos. 1,287,965 and 1,287,966.

In accordance with a preferred construction an interlock safety device is incorporated in the boom so that the pins can only be engaged or disengaged when the boom sections are in their retracted position.

Conveniently, the two hydraulic rams are synchronised as described in our British Pat. No. 1,381,665. This has the advantage that maximum boom efficiency is obtained without relying on the judgement of the operator to extend the movable sections by an equal amount.

Figure 2:
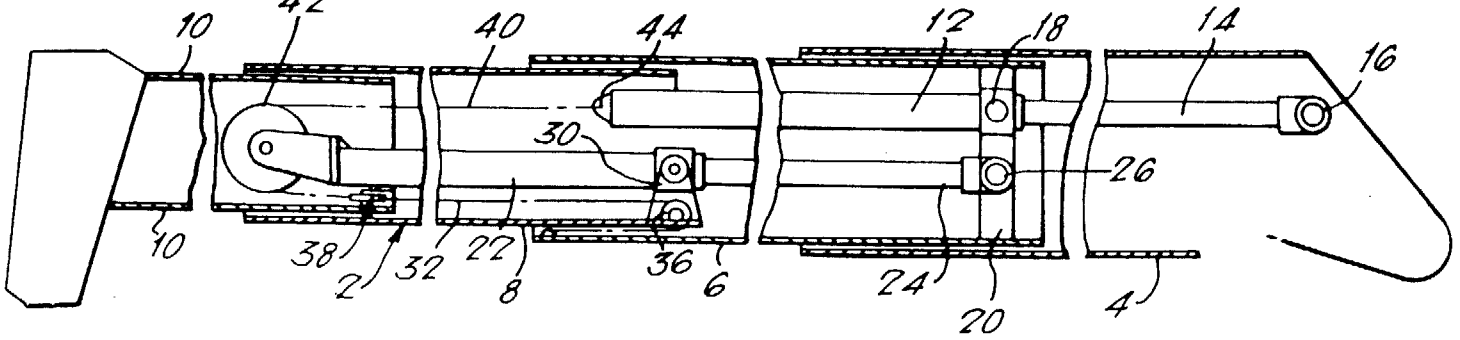
Figure 3:
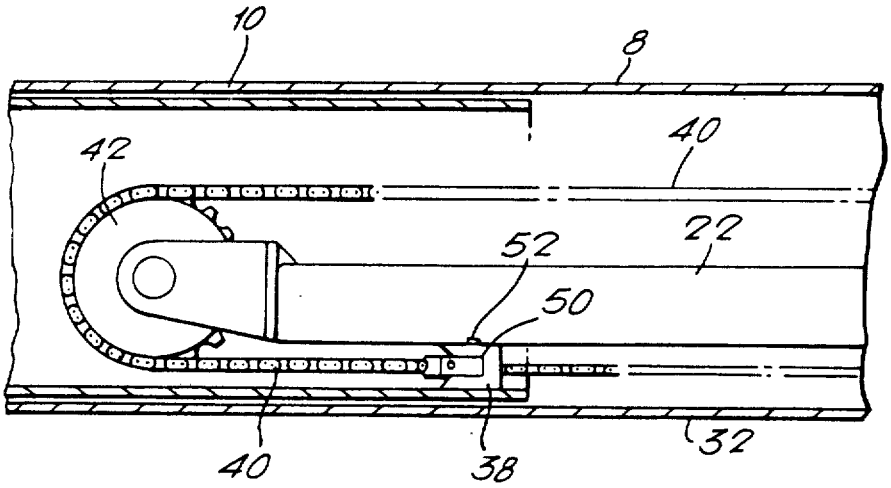
Figure 4:
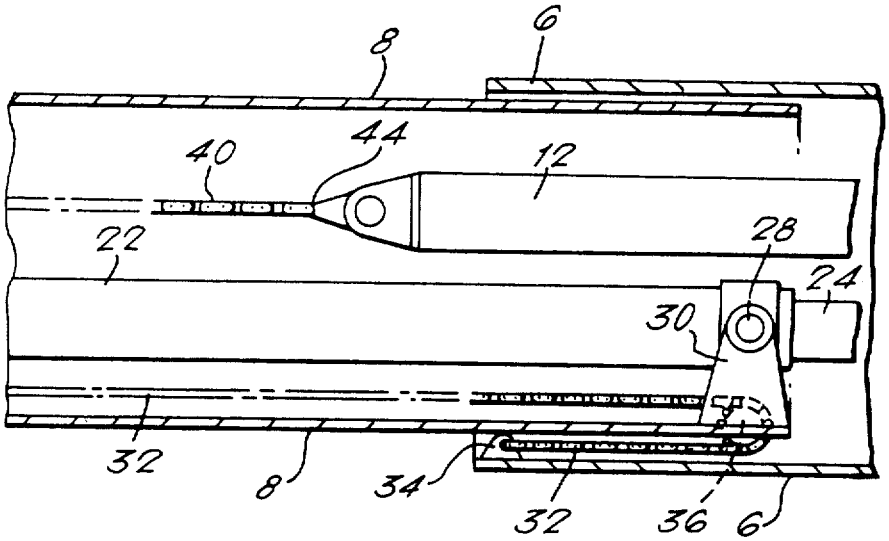
Figure 5:
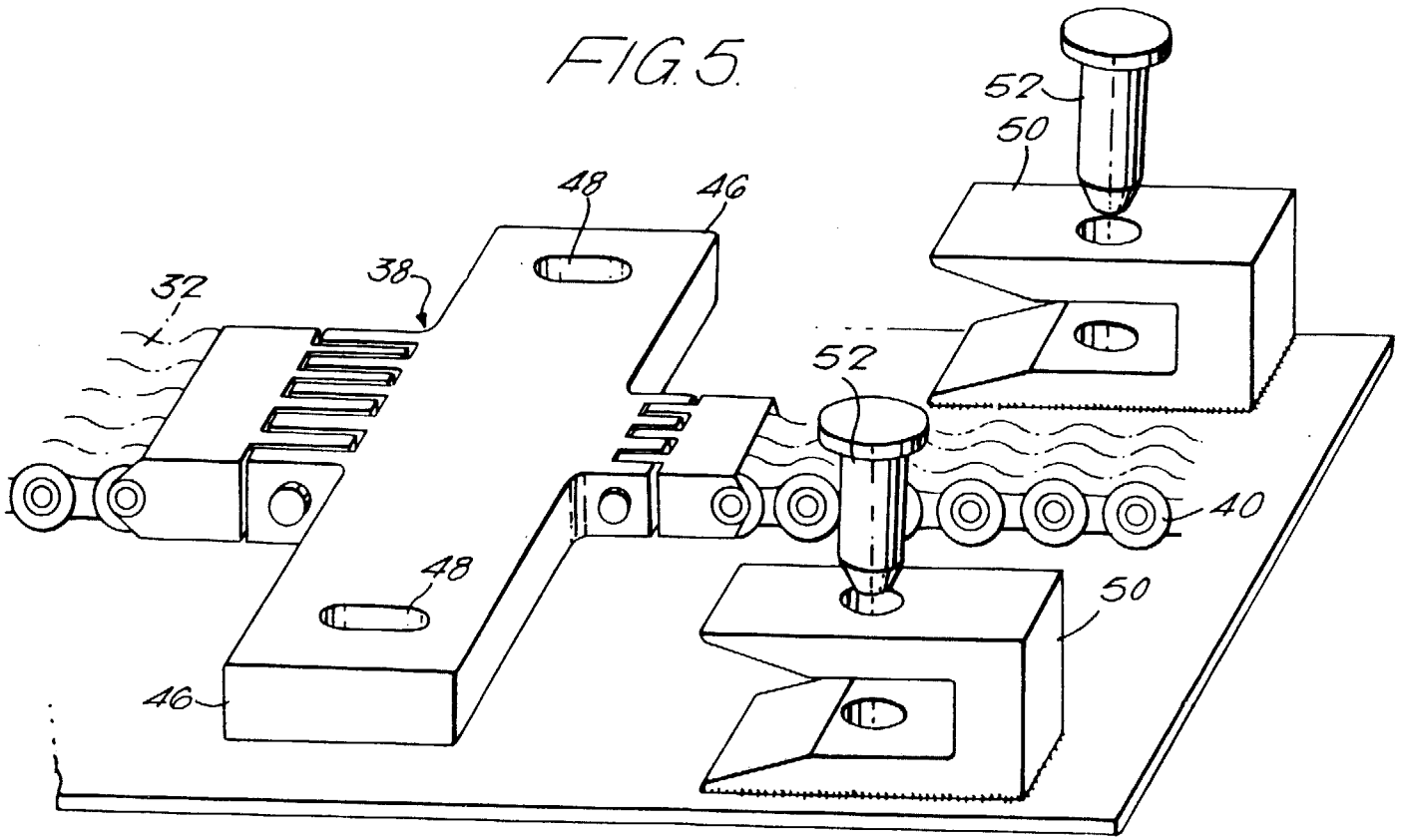
Figure 6:
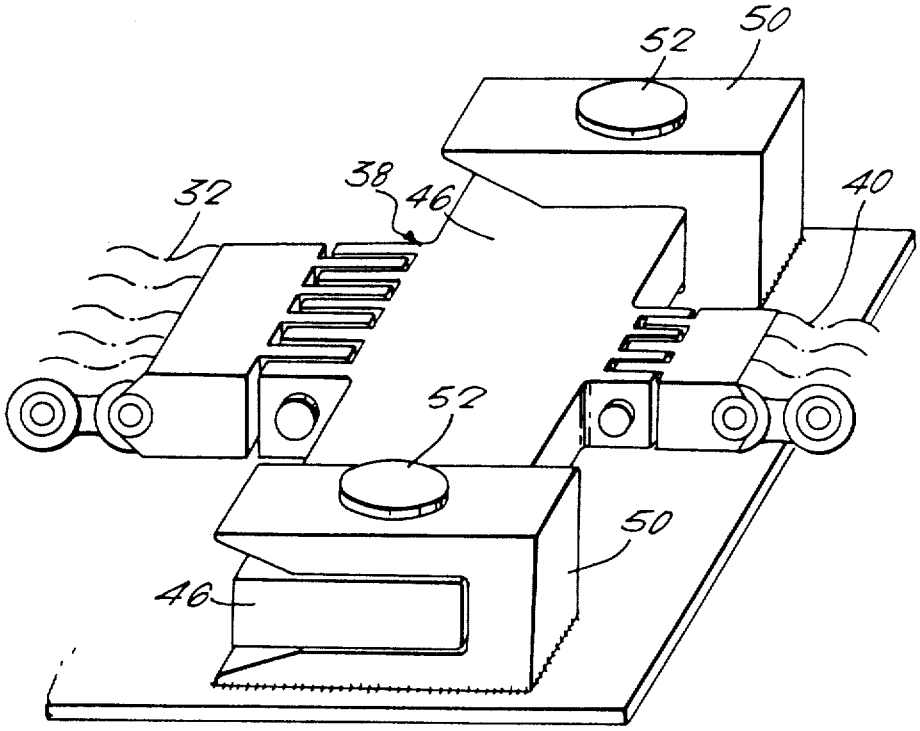
Figure 7:
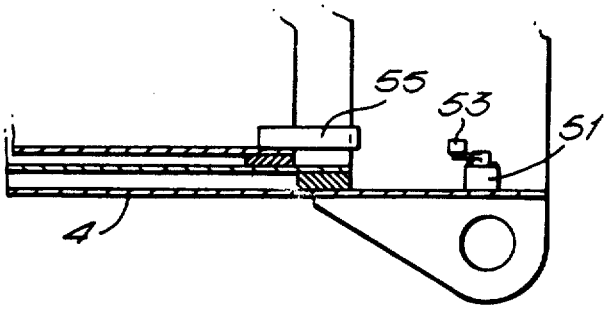
Figure 8:
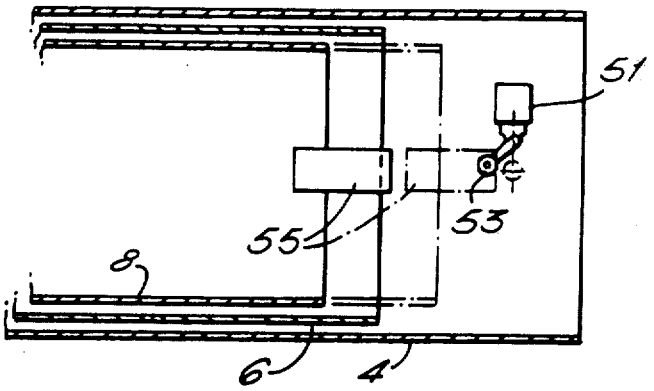

An embodiment of a telescopic boom according to the invention will now be described, by way of example, with reference to the accompanying drawings, in which:

FIG. 1 is a diagrammatic longitudinal section of one embodiment of a telescopic boom, according to the invention, in a partially extended position, FIG. 2 is a diagrammatic longitudinal section of the boom shown in FIG. 1 in the fully extended position, FIG. 3 is an enlarged fragmentary longitudinal section showing an anchor in the coupled position, FIG. 4 is an enlarged fragmentary section showing the method of securing one end of the chain to the first movable boom section, FIG. 5 is an enlarged perspective view of the chain and anchor securing means in the uncoupled condition, FIG. 6 is an enlarged perspective view of the chain and anchor securing device shown in FIG. 5, in the coupled condition, FIG. 7 is a fragmentary sectional side elevation of an electrically operated interlock safety device, and FIG. 8 is a plan of the safety device shown in FIG. 7.

Referring to the drawings the telescopic boom generally indicated at 2 comprises a base section 4 to which three telescopically arranged movable sections 6, 8, 10 are mounted. A hydraulic ram 12 is mounted within the sections and operatively connected between the base section 4 and the movable section 6, the piston rod 14 of the ram having its free end pivotally secured at 16 to the inner end of the section 4 of the boom, while the ram cylinder is pivotally secured at 18 to a bracket 20 at the inner end of the movable section 6.

A second hydraulic ram 22 is operatively connected between the movable sections 6 and 8, the piston rod 24 of the ram being pivotally secured at 26 to the support bracket 20, while the ram cylinder is pivotally mounted at 28 on a bracket 30 secured to the inner end of the movable section 8. A light duty chain diagrammatically indicated at 32 which acts as a retraction chain, has one of its ends secured at 34 to the outer end of the movable section 6 from which it passes around a pulley 36, mounted on the inner end of the movable section 8 the other end being secured to an anchor 38. A second heavy duty chain 40, which acts as an extension chain, is secured at one end to the anchor 38 and passes around a second pulley 42, pivotally mounted on the outer end of the ram 22, and has its other end secured at 44 to the free end of the ram 12.

The anchor 38 which is located between the ends of the chains 32 and 40 and is hinged thereto (see FIGS. 5 and 6) includes projecting side members 46 with slots 48 formed therein enabling the anchor to be releasably coupled with a pair of brackets 50 welded to the inner end of the movable section 10, by means of pins 52.

As the brackets and anchor are inaccessible during operation of the boom, the pins are engaged and disengaged remotely by means of units commonly known as linear actuators (not shown). These linear actuators are powered by electric motors as detailed in British Pat. Nos. 1,287,965 and 1,287,966, although they could equally well employ another source of energy such as pneumatics or hydraulics or even be manually operated.

With reference now to FIGS. 7 and 8, there is illustrated an electrically operated interlock safety device which enables the anchor 38 (see FIGS. 5 and 6) to be connected to or disconnected from the brackets 50 only when the boom sections are in their retractor or telescopically withdrawn position.

The interlock takes the form of a limit switch 51 which includes a spring-loaded arm 53, the switch being mounted on the internal wall of the base section 4. The arm 53 of the limit switch is positioned to engage a striker 55 attached to the innermost end of the movable central boom section 8.

Electric power which feeds the linear actuators is routed via the limit switch. The electric current can only be fed to the actuators when the striker 53 displaces the spring-loaded arm of the limit switch, as shown in chain-dotted line in FIG. 8, thus closing the switch contacts.

As the boom begins to extend, the spring-loaded arm 53 returns to its neutral position (see FIG. 7) opening the switch contacts and the supply of electric current to the linear actuators is prevented.

The telescopic boom may be operated in two distinct modes:

(i) In the first mode, as shown in FIG. 1, the telescopic rams 12 and 22 operate to move the movable sections 6 and 8 relative to the base section 4 and to each other. The brackets 50 of the third or outer section 10 are disconnected from the anchor 38 and the chain 32 and the third movable section 10 thus remains retracted within the movable section 8. The movable sections 6 and 8 are telescoped outwardly to their extended position and the payload exerts no load on the chain. This mode is equivalent to a boom with three movable sections including one "manual" section which is retracted.

(ii) In the second mode, as illustrated in FIG. 2, the two movable sections 6 and 8 are again movable telescopically by operation of the rams 12 and 22. The heavy duty chain 32 is however mechanically coupled to the movable section 10, by means of the anchor 38 being connected to the brackets 50, thus the third section 10 is driven outwardly by the chain using a 2:1 chain drive ratio, as the ram 22 operates to move the section 8.

The first mode is employed when the pay load is sufficiently large to cause chain loads to exceed a safe value if mode two were employed, or if the required boom length is obtainable using only two movable sections.

The second mode of operation is employed when boom lengths longer than those obtainable with the first mode are required and/or when the load, in the chain, due to the payload, does not exceed a safe value.

FIGS. 3 and 4 are enlarged details of FIG. 2 showing respectively, the anchor 38 secured to the brackets 50 and the bracket 30 by means of which the cylinder of ram 22 is mounted on the movable section 8.

The boom of the present invention has various advantages over the conventional system of powering the sections of a telescopic boom having three movable sections, with three separate rams. For example the boom of the present invention is less bulky, more economical and considerably lighter than the conventional three ram system thus improving the efficiency of the boom.

Various modifications may be made to the boom, for example, instead of using chains between the anchor and the first movable section another linear member, such as a steel wire or cable, could be used. Similarly instead of connecting the retraction chain 40 to the free end of the first hydraulic ram 12 a parallel rod could be interposed between the chain and the inner end of the moveable section 6.

The jib or boom of the invention may be used for cranes, hoists and the like.

What we claim is:

1. A multi-section telescopic boom comprising: a base section; first and second inner sections telescopically received within the base section; a third outermost section telescopically received within the [third] *second* section; a first ram having a first end connected to the base section and a second end connected to the first section for telescopically moving the first section relative to the base section; a second ram connected to the first section and to the second section for telescopically moving the second section relative to the first section; elongate, tension applying means having [first and second] *its* ends connected with the first section [and the second section], the tension applying means including an intermediate portion of a sufficient length so as to extend at least partially over the length of the third section; pulley means connected with the second section[, located within the longitudinal extent of the third section] and engaging [the intermediate portion of] the tension applying means so as to maintain the tension applying means taut; and coupling means connected with the tension applying means and the third section for releasably securing to the third section a part of the tension applying means; whereby extension *or retraction* of the second ram with the coupling means released causes no extension *or retraction* of the third section relative to the second section, and extension *or retraction* of the second ram with the coupling means engaged causes an extension *or retraction* of the third section relative to the second section.

2. A boom according to claim 1 wherein the coupling means includes an anchor member carried by the part of the tension applying means, a cooperating bracket shaped and positioned to receive the anchor member and secured to the third section, and means for selectively connecting and disconnecting the anchor member and bracket.

3. A boom according to claim 2 wherein the anchor member is secured to the third section at a point proximate an end of the third section closest to the base section.

[4. A boom according to claim 1 including means operatively coupled with the tension applying means for causing a retraction of the third section relative to the second section in response to a corresponding retraction of the second ram.]

5. A boom according to claim [4 wherein the retraction means includes an additional length of tension applying means; wherein an end of the additional length is connected with the first section; and including] *1*

*wherein the pulley means includes a* pulley [means] mounted to the second section adjacent an end closest to the base section [thereof] for guiding the tension applying means to the first section.

6. A boom according to claim 5 wherein [the] *at least one* end of the [additional length is] *tension applying means* connected with the first section *is attached thereto* adjacent an end thereof relatively remote to the base section.

7. A boom according to claim 2 wherein the last mentioned means includes a remotely controlled, linear actuator for engaging and releasing the anchor member from the bracket.

8. A boom according to claim 2 including means permitting the operation of the means for selectively connecting and disconnecting the anchor member to the bracket only when all sections are in their fully retracted positions.

9. A boom according to claim 2 wherein the anchor member has side members which project laterally from the tension applying means; wherein the bracket comprises first and second, generally U-shaped brackets straddling the part of the tension applying means and positioned to receive therein the side members; and wherein the side members and the brackets include apertures which are aligned when the members are received within the brackets; and wherein the means for selectively connecting and disconnecting includes movable pins extendable into and retractable from the apertures for releasably interconnecting the side members and the brackets.

10. A multi-section telescopic boom comprising: a base section; first and second inner sections telescopically received within the base section; a third, outermost section telescopically received within the second section; a first ram having a first end connected to the base section and a second end connected to the first section for telescopically moving the first section relative to the base section; a second ram connected to the first section and the second section for telescopically moving the second section relative to the first section; elongate, tension applying means having first and second ends connected with the first section [and the second section], the tension applying means [including an intermediate portion of a sufficient length so as to extend] *extending* into the third section; pulley means connected with the second section, [disposed within the third section] and engaging [the intermediate portion of] the tension applying means so as to maintain the tension applying means taut; and coupling means connected with the tension applying means and the third section for releasably securing to the third section part of the tension applying means disposed between [the] *an* end thereof connected with the [second] *first* section and the pulley means; whereby extension *or retraction* of the second ram with the coupling means released causes no extension *or retraction* of the third section relative to the second section, and extension *or retraction* of the second ram with the coupling means engaged causes an extension *or retraction* of the third section relative to the second section.

* * * * *